Dec. 15, 1925. 1,565,641
H. N. GRESLEY
STEAM OR OTHER LOCOMOTIVE COMPRISING BOOSTER ENGINE OR MOTOR
Filed Feb. 20, 1925 3 Sheets-Sheet 1

Dec. 15, 1925.
H. N. GRESLEY
1,565,641
STEAM OR OTHER LOCOMOTIVE COMPRISING BOOSTER ENGINE OR MOTOR
Filed Feb. 20, 1925
3 Sheets-Sheet 3
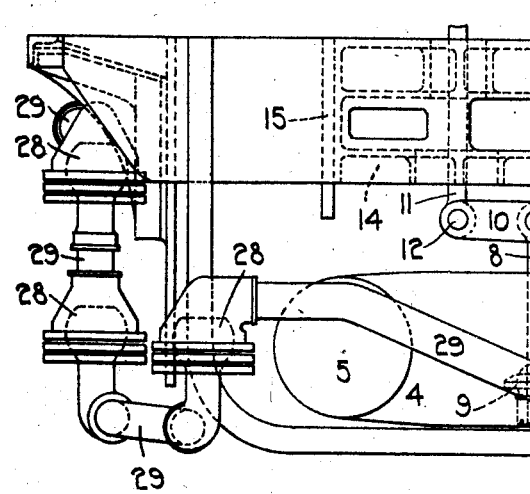
FIG. 3.
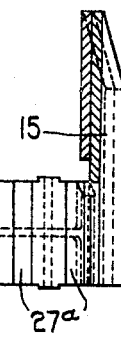
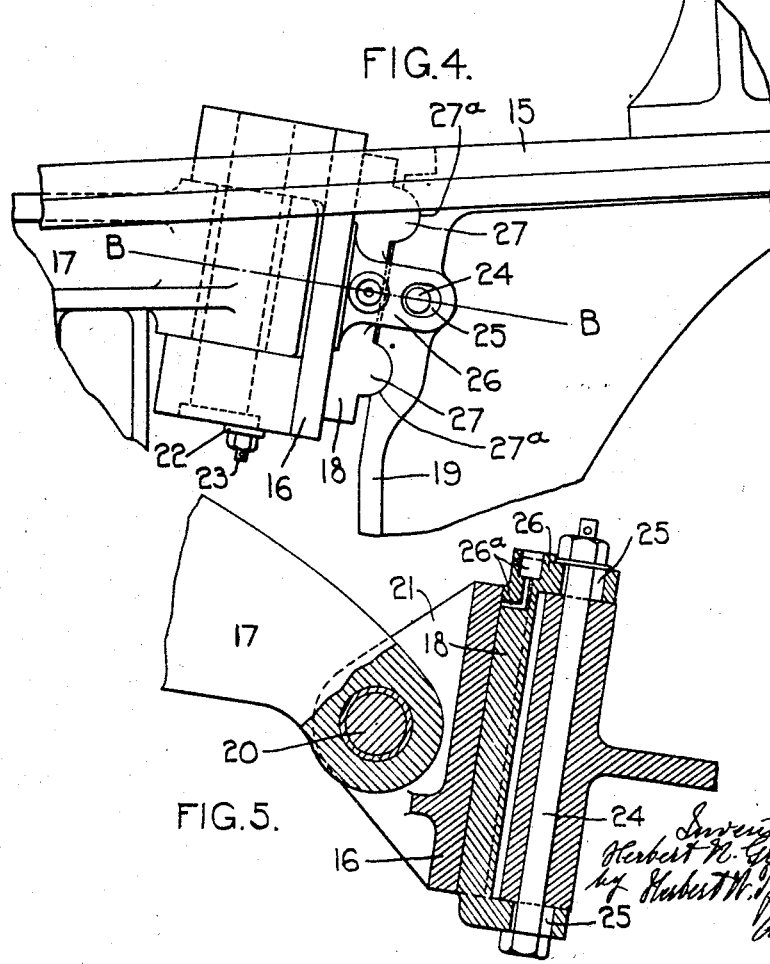
FIG. 4.
FIG. 5.

Patented Dec. 15, 1925.

1,565,641

UNITED STATES PATENT OFFICE.

HERBERT NIGEL GRESLEY, OF HADLEY WOOD, ENGLAND.

STEAM OR OTHER LOCOMOTIVE COMPRISING BOOSTER ENGINE OR MOTOR.

Application filed February 20, 1925. Serial No. 10,596.

*To all whom it may concern:*

Be it known that I, HERBERT NIGEL GRESLEY, a subject of the King of Great Britain, residing at Hadley Wood, in the county of Middlesex, England, have invented certain new and useful Improvements in or Relating to Steam or Other Locomotives Comprising Booster Engines or Motors; and I do hereby declare the following to be a full, clear, and exact description of the invention, such as will enable others skilled in the art to which it appertains to make and use the same.

This invention has for its object improvements in or relating to steam or other locomotives comprising or fitted with booster engines or motors.

In the case of a steam locomotive the booster engine or motor may as heretofore be mounted on or suspended from the main frame of the locomotive (or it may be the frame of the trailer truck or bogie) and the booster motor may consist of pistons in cylinders to and from which steam is respectively admitted and exhausted at the required times to operate the motor, and the said pistons may be arranged to drive the axle of the trailer wheels of the locomotive through the medium of suitable gearing or connections.

In the case of a large locomotive engine having a long wheel base it is necessary to give considerable side play to the trailing wheels to obviate wear of the wheel flanges, and to give freedom of movement it is desirable that the axle and wheels should move from side to side radially and not in a straight line. Such radial movements are secured either by the provision of a pony-truck pivoted about a fixed point on the locomotive frame, or by the provision of radial axle boxes with inside bearings, or by providing radial horns or axle box guides with outside bearings.

The present invention consists principally in means whereby when the booster engine is brought into action or is operating the thrust set up as between the booster engine or its bed-plate or frame and the main frame of the locomotive (or the trailer truck frame as the case may be) is transmitted directly to or is taken directly by the said main frame of the locomotive, or by means mounted on the said main frame, the said means being such or being so mounted on the main frame of the locomotive as to accommodate or permit of both vertical and horizontal or transverse movements taking place as between the booster engine or its bed-plate and the main frame of the locomotive. The said means for taking the thrust on the main frame of the locomotive, or on that part of the main frame at or adjacent to the trailing wheels, may consist of blocks or shoes mounted on the said main frame (or on parts fixed thereto), the said blocks or shoes being so mounted as to be capable of rocking or swivelling in such a manner as to accommodate or to permit of the above-mentioned vertical and horizontal movements taking place. The said thrust blocks or shoes mounted on the main frame of the locomotive may receive the thrust through the medium of thrust blocks or shoes carried by or mounted on the bed-plate or frame of the booster engine, the blocks or shoes on the bed-plate or frame of the booster engine being also such or so mounted as to accommodate or to permit the aforesaid vertical and horizontal movements between the booster engine bed-plate or frame and the main frame of the locomotive or engine on which it is mounted.

By the provision of means for taking the thrust on the main frame of the locomotive as above mentioned, instead of on the axle box guides or horns and parts operatively associated therewith, objectionable and injurious or dangerous thrusts and shocks are obviated, and other advantages which will be appreciated by locomotive engineers are obtained.

Fig. 1 of the accompanying drawings shows, partly in side elevation and partly in central longitudinal section, sufficient of a locomotive underframe with booster motor as to illustrate the invention.

Fig. 3 is an end view partly in section corresponding to the line A A of Fig. 2.

Fig. 4 shows, to an enlarged scale, the coacting rocking thrust plates shown in Fig. 2, and Fig. 5 is a vertical section corresponding to the line B B of Fig. 4.

Figure 1:
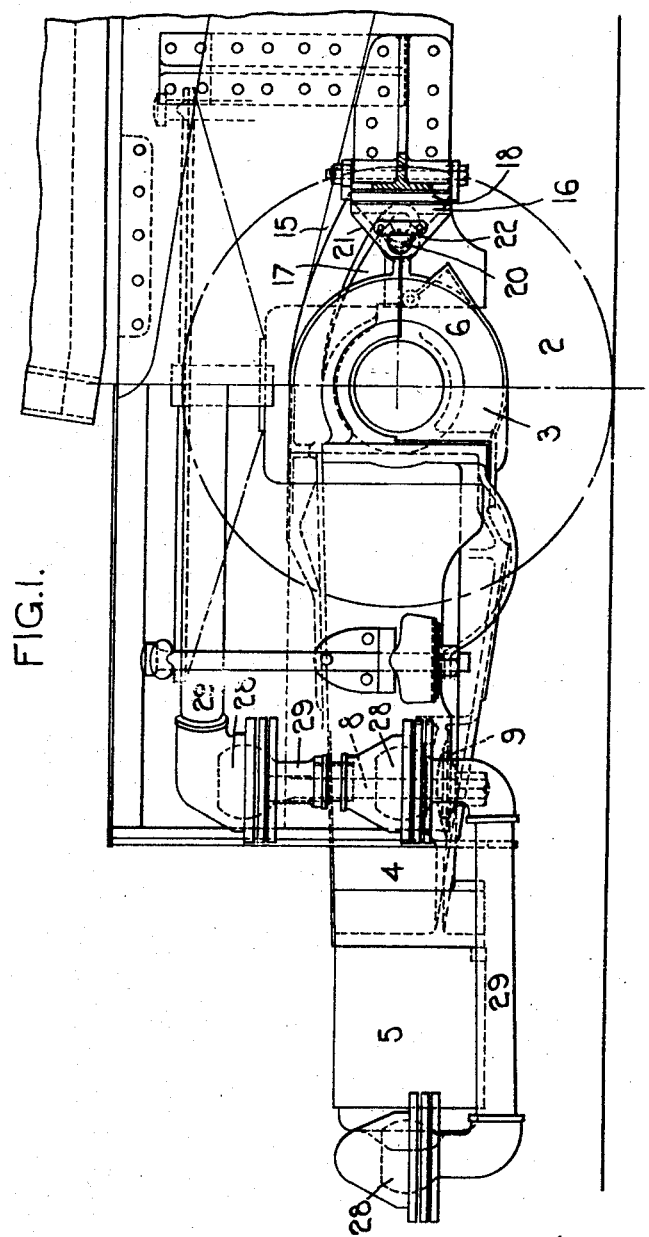
Figure 2:
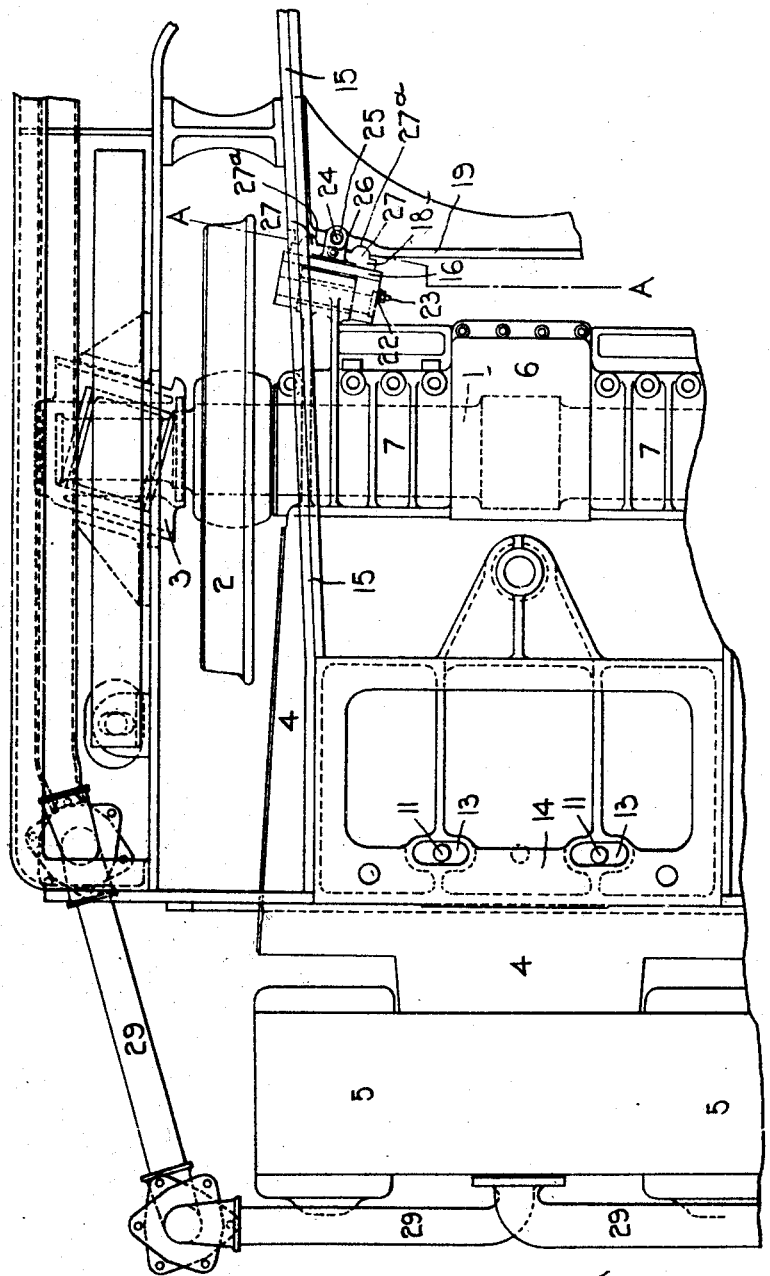
Fig. 2 is a plan of the parts shown in Fig. 1.

1 indicates the axle of the locomotive on which the trailing wheels 2 thereof are secured and 3 the axle boxes for said axle which are guided in known manner to provide for the radial movements arising from the considerable side play that must be given to the trailing wheels 2 to obviate wear of the wheel flanges.

4 indicates the frame of the booster motor and 5 the cylinders of the said motor at the rear end of said frame.

As usual the booster motor is arranged to drive the trailer axle 1 through suitable gearing, not shown, enclosed in the casing 6 secured to the booster frame 4.

The forward end of the booster motor frame 4 is provided with bearings 7 that embrace the axle 1 and the said frame is suspended from the rear end of the main frame of the locomotive, the suspension means comprising a rod or link 8 carrying near its lower end a bearing plate 9 with part-spherical upper face on which rests a suitably shaped part of the booster frame, a link 10 to a mid point of which the upper end of the rod 8 is connected by a pin, and two rods 11 connected to the locomotive frame and to the lower ends of which the ends of the link 10 are connected by pins 12. The rods 11 pass through clearance slots 13 in a webbed casting 14 connecting the rear ends of longitudinal members 15 of the main frame of the locomotive.

Thrust set up between the booster motor frame 4 and the main frame of the locomotive when the booster motor is operating, is, according to the present invention, transmitted to the main frame of the locomotive by means of rocking shoes 16 mounted on side arms 17 projecting forwardly from the booster motor frame 4, and co-acting rocking shoes 18 mounted on a fixed part 19 of the frame of the locomotive. The said fixed part 19 consists of a transverse member connected at its end to the longitudinal members 15 of the locomotive frame. These rocking shoes or thrust members are shown clearly in Figs. 4 and 5 and as will be seen from these figures, each rocking shoe 16 of the booster motor frame is mounted to rock on a horizontal pivot pin 20 carried in the boss-like end of the corresponding forwardly projecting arm 17 of the booster motor frame. The said rocking shoe is formed with rearwardly projecting lugs 21 that embrace the end of the arm 17. A keeper plate 22, fixed by studs and nuts 23 to one of the lugs 19 is provided to prevent the pivot pin 20 working out, the said pin being formed with a head over part of which the keeper plate 22 extends. The rocking shoe 18 on the flat face of which the corresponding face of the rocking shoe 16 bears and on which it can slide both vertically and horizontal, is secured to the member 19 of the main frame by a vertical retaining bolt 24 that is passed through a hole formed therefor in the said member 19 and through slots 25 formed in centrally arranged lugs 26 forwardly projecting from the upper and lower ends of the rocking shoe 18 and embracing that part of the fixed frame member 19 through which the hole for the bolt 24 is formed. Projecting from the forward face of the rocking shoe 18 are two vertical ribs 27 of curved section located one at each side of the central vertical plane of the said shoe. The curved faces of these ribs bear on the bottoms of correspondingly curved vertical recesses 27$^a$ formed therefor in the frame member 19 and the arrangement is such that the shoe 18 can rock or oscillate on one or other of the curved faces of the said ribs 27.

26$^a$ indicates a hole formed through the upper lug 26 of the rocking plate 18 through which oil may be led to the rubbing surfaces of the rocking plate.

Flexible unions or joints 28 of the ball and socket type are inserted in the pipe lines 29 supplying steam to the booster engine from the locomotive boiler.

The rocking shoes 18 on which the rocking shoes 16 of the booster engine can slide are mounted on the frame of the trailer truck or bogie of the locomotive in cases where the booster engine is suspended from the frame of the said trailer truck or bogie.

Variations or modifications may be made in the details of construction and arrangement of the parts above described without departing from the invention.

What I claim is:—

1. In a locomotive, a main frame, trailer wheels, an axle on which said trailer wheels are fixed, a booster engine structure supported by said main frame and in driving connection with said axle, and means adapted to transmit directly to said main frame the thrusts set up when the booster engine is operating.

2. In a locomotive, a main frame, trailer wheels, an axle on which said trailer wheels are fixed, a booster engine structure supported by said main frame and in driving connection with said axle, thrust blocks on the said main frame, and thrust blocks on the forward end of said booster structure mounted to bear and slide on the said thrust blocks on the main frame.

3. In a locomotive, a frame, a booster engine supported by said frame, trailer wheels in driving connection with said booster engine, rocking thrust blocks mounted on said booster engine, and counter thrust blocks mounted on said frame on which counter thrust blocks said first-mentioned thrust blocks bear and on which they can slide.

4. In a locomotive, a frame, a booster engine supported by said frame, trailer wheels in driving connection with said booster engine, rocking thrust blocks mounted one at each side at the forward end of the said booster engine, and counter thrust blocks mounted on said frame on which counter thrust blocks said first-mentioned thrust blocks bear and on which they can slide.

5. In a locomotive, a frame, a booster engine supported by said frame, trailer wheels in driving connection with said booster engine, rocking thrust blocks mounted on said booster engine, and counter thrust blocks on which said first-mentioned thrust blocks bear and on which they can slide, said counter thrust blocks being mounted to rock on said frame.

6. In a locomotive, a frame, a booster engine supported by said frame, trailer wheels in driving connection with said booster engine, thrust blocks mounted to rock about horizontally arranged pins carried by said booster engine, and counter thrust blocks on which said first-mentioned thrust blocks bear and on which they can slide, said counter thrust blocks being mounted to rock about vertical axes on said frame.

7. In a locomotive, a main frame, trailer wheels an axle on which said trailer wheels are fixed, a booster engine structure supported by said main frame and in driving connection with said axle, a boss on each side of the forward end of said booster engine structure, a horizontal pin mounted in said boss, a thrust shoe mounted to rock on said pin, a counter thrust shoe on which said rocking shoe can bear and slide, a vertical pin connecting said counter shoe to said main frame, vertical fulcrum webs projecting from the back of said counter shoe, and recesses in a member of said main frame adapted to receive said fulcrum webs.

8. In a locomotive, a main frame, trailer wheels, an axle on which said trailer wheels are fixed, a booster engine structure supported by said main frame and in driving connection with said axle, a boss on each side of the forward end of said booster engine structure, a horizontal pin mounted in said boss, a thrust shoe mounted to rock on said pin and formed with lugs that embrace said boss, a counter thrust shoe on which said rocking shoe can bear and slide, a vertical pin connecting said counter shoe to said main frame, vertical fulcrum webs projecting from the back of said counter shoe, and recesses in a member of said main frame adapted to receive said fulcrum webs.

In testimony whereof I affix my signature.

HERBERT NIGEL GRESLEY.